Sept. 11, 1956      D. JACKSON      2,762,860
TELEVISION CAMERAS

Filed Jan. 13, 1953      2 Sheets-Sheet 1

INVENTOR
Donald Jackson
BY
Holcombe, Wetherill & Brisebois
ATTORNEY

Sept. 11, 1956     D. JACKSON     2,762,860
TELEVISION CAMERAS
Filed Jan. 13, 1953     2 Sheets-Sheet 2
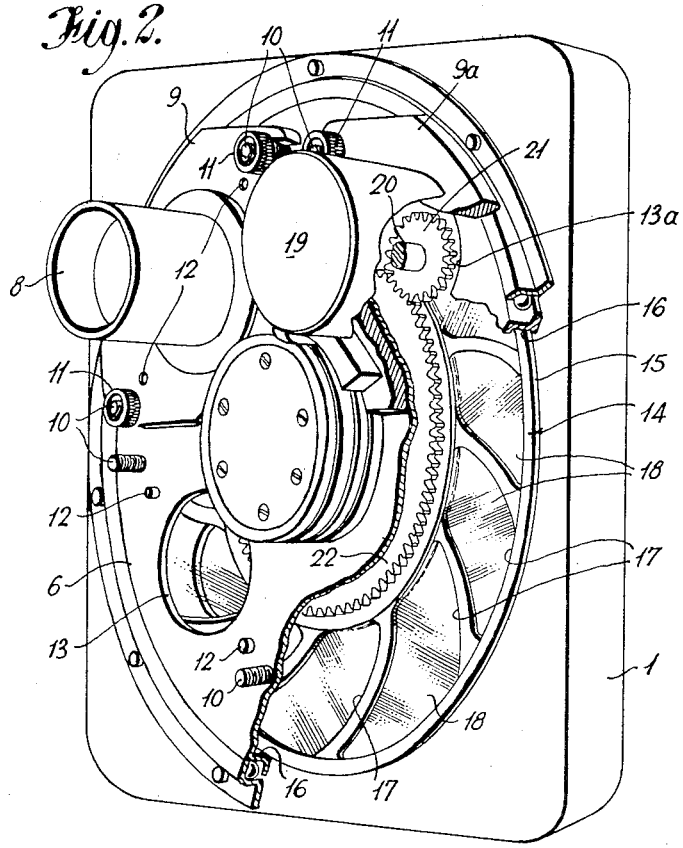
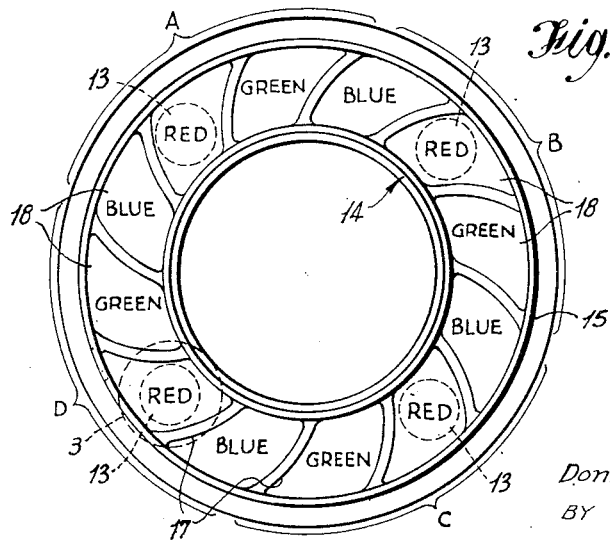
INVENTOR
Donald Jackson
BY
Holcombe, Wetherill & Brisebois
ATTORNEY United States Patent Office 2,762,860
Patented Sept. 11, 1956

2,762,860

TELEVISION CAMERAS

Donald Jackson, Cambridge, England, assignor to Pye Limited, Cambridge, England, a British company Application January 13, 1953, Serial No. 331,019

6 Claims. (Cl. 178—5.4)

The present invention relates to television cameras of the kind in which a plurality of different lenses are mounted on a turret at the front of the camera, the turret being rotatable selectively to move any one of the lenses carried thereby into an operative position in alignment with the optical axis of the camera. It is an object of the invention to provide novel means for the adaptation of such a camera for colour television operating in accordance with the principle in which a multiple colour filter is rotated in front of the pick-up tube in synchronism with the frame frequency in order to derive the different colour components to be transmitted. In existing cameras the space inside the camera housing is generally closely packed with equipment, and it is therefore a further object of this invention to provide means permitting such adaptation to be effected, which requires only a minimum of space inside the camera.

It is a further object of the present invention to provide a rotatable colour filter arrangement for a camera of the kind specified which permits the turret to be rotated whilst the camera is in use to select the lens to be employed without interfering with the synchronism of the colour synthesis of the picture.

With this object in view, the present invention consists in a television camera for colour television, comprising a pick-up tube, a rotatable turret carrying a plurality of camera lenses disposed around the axis of the turret at integral multiples of a common angle which itself is a sub-multiple of 360°, means for rotating the turret selectively to move the lenses into an operative position relative to the pick-up tube, a multiple colour filter rotatably mounted coaxially with the turret and comprising identical sections each containing colour filter elements corresponding to the different colour components, said sections being disposed around the axis of rotation of the multiple colour filter at said common angle, and a motor carried by and movable with the turret for rotating said multiple colour filter. With this arrangement, at any instant, filter elements of the same colour will lie opposite the optical axis of each of the lenses carried by the turret, whereby rotation of the turret to select a particular lens will not disturb the predetermined synchronous relation between the individual colour elements and the frame periods of the television transmission system.

The colour filter elements may be carried by an annular member rotatably located in an annular groove or by one or more annular guides formed in or carried on the back of the turret plate, so that the filter elements will be guided for movement in an annular path which lies behind the path of movement of the lens apertures in the turret plate. Thus, from another aspect, the invention provides a turret assembly for a television camera, comprising a turret plate having a number of apertures uniformly spaced along a circle, means for supporting said plate for rotation coaxially with said circle, an annular groove concentric with said circle being formed at one side of said plate, an annular multiple colour filter mounted in said groove for coaxial rotation relative to said plate behind said apertures, an electric motor mounted on the opposite side of said plate, and drive means extending from said motor through said plate to transmit rotation from said motor to said multiple colour filter, said multiple colour filter including a circular array of filter elements, wherein each element is identically repeated at angular intervals corresponding to the angles by which said apertures are spaced from each other.

The different filter elements correspond successively with the different colour components of the system, for example red, green and blue in a three-colour system, and are so dimensioned and disposed in the plurality of sections, each comprising the three colour elements, that a plurality of sections will be disposed around the annular member, with the angular spacing between different sections corresponding to or being a sub-multiple of the angular spacing of the lens positions on the turret.

The accompanying drawings illustrate, by way of example, one embodiment according to the invention.

In the drawings:

Fig. 2 shows a perspective view, partly cut away, of the turret assembly,

Fig. 3 is a diagram illustrating the arrangement of the colour filter elements of the multi-colour filter.

Figure 1:
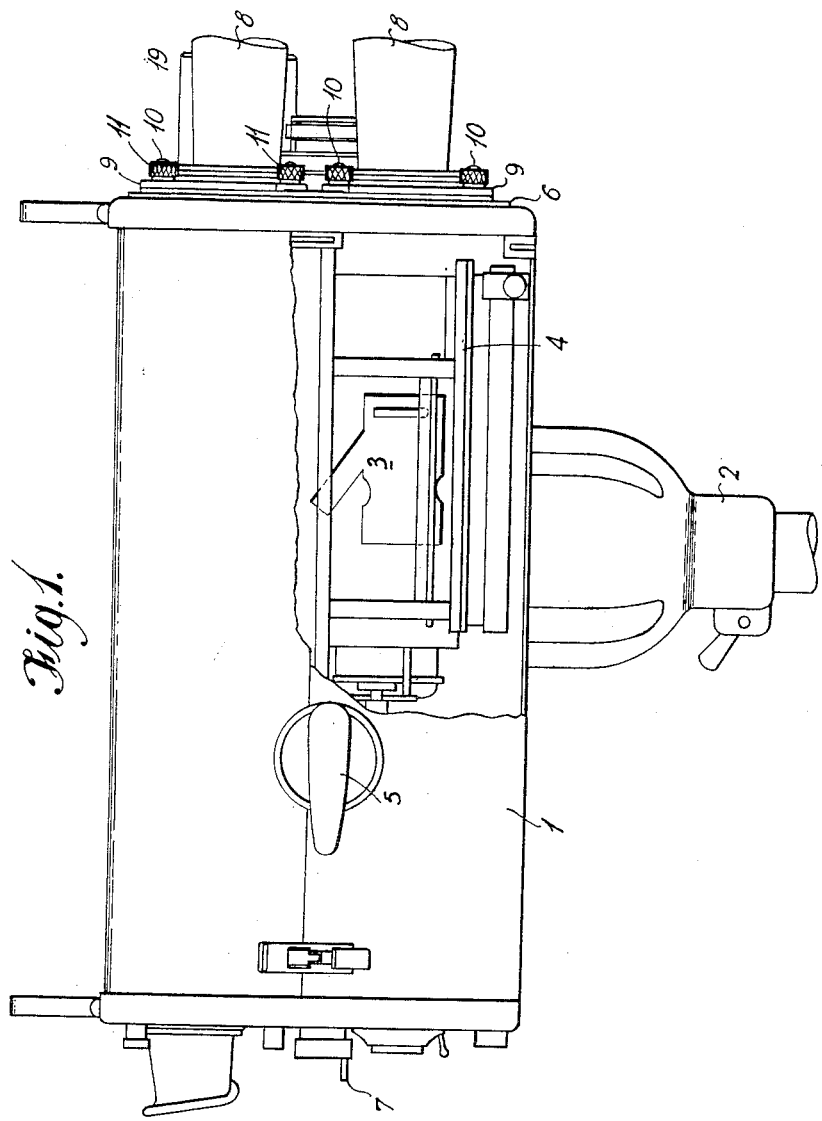
Fig. 1 shows a side view, partly cut away, of a television camera.

Referring now to the drawings, the illustrated television camera comprises a camera housing 1, mounted on a stand 2, in which a pick-up tube 3 is carried for focusing adjustment along a slideway 4 by means of a focusing handle 5 towards and away from a turret plate 6 which can be rotated, by means of a handle 7, to move selectively one or another of the three lenses 8 into alignment with the pick-up tube 3. Each lens 8 is carried by a mounting plate 9, which in turn is secured to the turret plate 6 by means of a pair of threaded studs 10 which extend through bores or slots in the plates 9 and the associated knurled clamping nuts 11. Dowels 12 serve accurately to locate each lens and mounting plate relative to a lens aperture 13 in the turret plate 6, the three apertures 13, together with a fourth aperture 13a, being disposed around the axis of the turret at angles of 90° to each other. A multiple colour filter 14 is rotatably mounted at the back of the turret plate 6. As illustrated it comprises an annular frame 15 of metal or other opaque material, which is mounted for rotation in an annular groove 16 formed at the back of the turret plate 6 concentrically with the turret axis. This frame is formed with apertures 17 which are spaced around its circumference, and are each fitted with a colour filter element 18, so that when the frame is rotated, the various colour filter elements 18 move in succession past each of the lens apertures 13. The series of apertures 17 is arranged to form four sections A, B, C, D (Fig. 3), each section containing the different colour elements of the system, for example red, green and blue in the case of a three-colour system, with the same order of sequence in each section. The angular spacing between each section is 90° corresponding to the angular spacing of the apertures 13, 13a of the turret, so that at each moment each of the three lens apertures 13 faces a filter element of the same colour. Alternatively the same result may be obtained by making the angular spacing between each section an integral sub-multiple of the angular spacing of said lens apertures, for example by providing eight three-colour sections arranged at 45° to each other.

To drive the multiple colour filter, a motor 19 adapted to be driven in synchronism with the television frame frequency, is mounted on the turret plate 6 over the aperture 13a. The motor shaft 20 extends through the aperture 13a to the back of the turret plate 6 where it carries a pinion 21 which engages a gear wheel 22 formed or mounted coaxially on the annular frame 15. The motor is attached to the turret plate 6 by a mounting plate 9a identical, at least as far as its attachment and locating means are concerned, with the mounting plates 9 for the lenses 8.

With this construction, since the motor is carried by the turret plate, rotation of the turret to move another lens into line with the pick-up tube will cause the multiple colour filter to be turned bodily through the same angle, thus maintaining the synchronous relationship between the individual colour filter elements and the frame periods of the transmitted waveform.

Although one specific embodiment has been described, it will be understood that various modifications may be made without departing from the scope of the invention.

I claim:

1. In a television camera for colour television, having a pick-up tube, a rotatable turret carrying a plurality of camera lenses disposed around the axis of the turret at integral multiples of a common angle which itself is a sub-multiple of 360°, and means for rotating the turret to selectively move each of the lenses into an operative position relative to the pick-up tube, the combination of a multiple colour filter rotatably mounted coaxially with the turret and comprising a plurality of identical sections, each section containing at least one colour filter element corresponding to each of a plurality of different colour components, said sections being disposed around the axis of rotation of the multiple colour filter at said common angle, an electric motor having a stator and a rotor rotatably supported in the stator, said stator being fixedly supported on said rotatable turret, and means for transmitting rotary movement from said rotor to said multiple colour filter.

2. A television camera as claimed in claim 1, wherein said turret has a plurality of apertures uniformly spaced around the axis of the turret, the number of apertures being greater than the number of said lenses, and each lens being mounted detachably on the turret in front of one of said apertures respectively, the motor stator including a housing similarly mounted detachably in front of a further one of said apertures, said transmitting means including a motor shaft carrying the rotor, the multiple colour filter being arranged at the back of the turret, and the motor shaft extending through said last mentioned aperture.

3. A television camera as claimed in claim 2, wherein the individual lenses are provided with, and respectively carried by, interchangeable mounting plates having locating means, the motor housing being similarly carried by a mounting plate having locating means similar to those of the lens-carrying mounting plates, and the turret being provided with complementary locating and attachment means adjacent each aperture.

4. A television camera as claimed in claim 2, wherein the multiple colour filter has a toothed ring fast to it, and the motor shaft carries a pinion in driving engagement with said toothed ring.

5. For a television camera, a turret plate having a number of apertures uniformly spaced along a circle, means for supporting said plate for rotation coaxially with said circle, an annular groove concentric with said circle being formed at one side of said plate, an annular multiple colour filter mounted in said groove for coaxial rotation relative to said plate behind said lens apertures, an electric motor mounted on the opposite side of said plate, and drive means extending from said motor through said plate to transmit rotation from said motor to said multiple colour filter, said multiple colour filter including a circular array of filter elements of different colours, the filter elements of each colour being repeated around said array at uniform angular intervals equal to those by which said apertures are spaced around said circle.

6. In a camera for colour television, a turret plate assembly comprising a turret plate having a plurality of apertures uniformly spaced along a common circle, a plurality of identical lens holding means respectively associated with each said aperture, a multiple colour filter including a circular array of filter elements of different colours, the filter elements of each colour being repeated around said array at uniform angular intervals equal to those by which said apertures are spaced around said circle, means for supporting said filter for rotation about an axis perpendicular to said plate and passing substantially through the centre of said circle, an electric motor having mounting means constructed for cooperation with said lens holding means, said motor having a driving element constructed to project through such aperture when said mounting means are placed into cooperation with the lens-holding means associated with said aperture to mount the motor, and drive means on said multiple filter for driving engagement with said driving element of the motor when said motor is thus mounted.

References Cited in the file of this patent

UNITED STATES PATENTS

| | | |
|---|---|---|
| 2,435,962 | Goldmark | Feb. 17, 1948 |
| 2,478,598 | Somers | Aug. 9, 1949 |
| 2,575,536 | Thompson | Nov. 20, 1951 |
| 2,607,845 | Clark | Aug. 19, 1952 |